United States Patent
Tobin et al.

(10) Patent No.: US 12,365,120 B2
(45) Date of Patent: Jul. 22, 2025

(54) SYSTEM AND METHOD FOR MANUFACTURING PANELS FOR USE IN WIND TURBINE ROTOR BLADE COMPONENTS

(71) Applicant: General Electric Company, Schenectady, NY (US)

(72) Inventors: James Robert Tobin, Greenville, SC (US); Andrew McCalip, Houston, TX (US)

(73) Assignee: GE Infrastructure Technology LLC, Greenville, SC (US)

( * ) Notice: Subject to any disclaimer, the term of this patent is extended or adjusted under 35 U.S.C. 154(b) by 409 days.

(21) Appl. No.: 17/627,213

(22) PCT Filed: Jul. 16, 2019

(86) PCT No.: PCT/US2019/041909
§ 371 (c)(1),
(2) Date: Jan. 14, 2022

(87) PCT Pub. No.: WO2021/010981
PCT Pub. Date: Jan. 21, 2021

(65) Prior Publication Data
US 2022/0314504 A1    Oct. 6, 2022

(51) Int. Cl.
*B29C 43/52* (2006.01)
*B29C 43/22* (2006.01)
(Continued)

(52) U.S. Cl.
CPC ............ *B29C 43/52* (2013.01); *B29C 43/228* (2013.01); *B29C 43/48* (2013.01); *B29C 70/46* (2013.01);
(Continued)

(58) Field of Classification Search
CPC ....... B29C 43/228; B29C 43/52; B29C 43/48; B29C 2043/48; B29C 48/9145;
(Continued)

(56) References Cited

U.S. PATENT DOCUMENTS

| 2,884,078 A | 4/1959 | Stamm et al. |
| 3,207,062 A * | 9/1965 | Van Hartesveldt ... B31F 1/0096 100/312 |

(Continued)

FOREIGN PATENT DOCUMENTS

| AU | 2011304537 B2 | 3/2012 |
| CA | 2517951 A1 | 9/2004 |

(Continued)

OTHER PUBLICATIONS

Chinese Office Action with Translation, Nov. 15, 2023.
PCT International Search Report & Written Opinion Corresponding to PCT/US2019/041909 on Mar. 18, 2020.

*Primary Examiner* — Michael A Tolin
*Assistant Examiner* — Hana C Page
(74) *Attorney, Agent, or Firm* — Dority & Manning, P.A.

(57) ABSTRACT

A system for manufacturing a panel includes a forming assembly having opposing press plates and at least one platen assembly arranged between the opposing press plates. The platen assembly includes first and second platens connected together via at least one elastic deformable member. Further, the forming assembly is operable in a heating mode and a cooling mode. Moreover, the first platen is maintained at a predetermined temperature range during each of the heating and cooling modes. During the heating mode, the elastic deformable member(s) is compressed such that the first and second platens contact each other. As such, one or more layers of material to be consolidated are held by the
(Continued)

forming assembly as the forming assembly applies heat and pressure to the layer(s), thereby consolidating the panel.

12 Claims, 11 Drawing Sheets

(51) Int. Cl.
    *B29C 43/32*           (2006.01)
    *B29C 43/48*           (2006.01)
    *B29C 70/46*           (2006.01)
    B29K 105/08        (2006.01)
    B29L 31/08         (2006.01)

(52) U.S. Cl.
    CPC .......................... *B29C 2043/3255* (2013.01);
         *B29C 2043/483* (2013.01); *B29K 2105/08*
         (2013.01); *B29L 2031/085* (2013.01)

(58) Field of Classification Search
    CPC . B29C 33/02; B29C 70/46; B29C 2043/3255;
         B29C 2043/3261; B29C 43/04
    See application file for complete search history.

(56) References Cited

U.S. PATENT DOCUMENTS

| | | | |
|---|---|---|---|
| 4,329,119 A | 5/1982 | Baskin | |
| 4,474,536 A | 10/1984 | Gougeon et al. | |
| 4,826,560 A | 5/1989 | Held | |
| 5,460,764 A | 10/1995 | Held | |
| 5,476,704 A | 12/1995 | Köhler | |
| 5,484,500 A * | 1/1996 | Kaufmann | B32B 27/28 |
| | | | 156/289 |
| 6,264,877 B1 | 7/2001 | Pallu De La Barriere | |
| 7,473,385 B2 | 1/2009 | Stiesdal et al. | |
| 7,503,752 B2 | 3/2009 | Gunneskov et al. | |
| 7,625,185 B2 | 12/2009 | Wobben | |
| 7,637,721 B2 | 12/2009 | Driver et al. | |
| 7,654,799 B2 | 2/2010 | Eyb | |
| 7,854,594 B2 | 12/2010 | Judge | |
| 7,922,454 B1 | 4/2011 | Riddell | |
| 7,976,275 B2 | 7/2011 | Miebach et al. | |
| 8,057,189 B2 | 11/2011 | Riahi | |
| 8,079,818 B2 | 12/2011 | Burchardt et al. | |
| 8,114,329 B2 | 2/2012 | Karem | |
| 8,142,162 B2 | 3/2012 | Godsk et al. | |
| 8,147,209 B2 | 4/2012 | Godsk et al. | |
| 8,168,027 B2 | 5/2012 | Jacobsen et al. | |
| 8,172,538 B2 | 5/2012 | Hancock et al. | |
| 8,262,361 B2 | 9/2012 | Sanz Pascual et al. | |
| 8,297,932 B2 | 10/2012 | Arocena De La Rua et al. | |
| 8,297,933 B2 | 10/2012 | Riahi | |
| 8,317,479 B2 | 11/2012 | Vronsky et al. | |
| 8,348,622 B2 | 1/2013 | Bech | |
| 8,353,674 B2 | 1/2013 | Bech | |
| 8,455,090 B2 | 6/2013 | Schmidt et al. | |
| 8,506,258 B2 | 8/2013 | Baker et al. | |
| 8,511,996 B2 | 8/2013 | Llorente Gonzalez et al. | |
| 8,517,689 B2 | 8/2013 | Kyriakides et al. | |
| 8,540,491 B2 | 9/2013 | Gruhn et al. | |
| 8,545,744 B2 | 10/2013 | Jones | |
| 8,580,060 B2 | 11/2013 | Bech | |
| 8,657,581 B2 | 2/2014 | Pilpel et al. | |
| 8,673,106 B1 | 3/2014 | Jolley et al. | |
| 8,696,317 B2 | 4/2014 | Rudling | |
| 8,747,098 B1 | 6/2014 | Johnson et al. | |
| 8,764,401 B2 | 7/2014 | Hayden et al. | |
| 8,826,534 B2 | 9/2014 | Cappelli et al. | |
| 8,827,655 B2 | 9/2014 | Bech | |
| 8,894,374 B2 | 11/2014 | Fuglsang et al. | |
| 8,918,997 B2 | 12/2014 | Kyriakides et al. | |
| 8,961,142 B2 | 2/2015 | Wansink | |
| 8,992,813 B2 | 3/2015 | Robbins et al. | |
| 9,790,919 B2 | 10/2017 | Leonard et al. | |
| 10,124,545 B2 * | 11/2018 | Daton-Lovett | B29C 43/224 |
| 11,241,809 B2 * | 2/2022 | Yasuda | B29C 33/04 |
| 11,668,275 B2 * | 6/2023 | Tobin | B29C 70/08 |
| | | | 416/61 |
| 2004/0265553 A1 * | 12/2004 | Rockwell | E04B 1/7662 |
| | | | 425/371 |
| 2007/0036659 A1 | 2/2007 | Hibbard | |
| 2009/0148300 A1 | 6/2009 | Driver et al. | |
| 2010/0098549 A1 | 4/2010 | Mironov | |
| 2010/0278654 A1 | 11/2010 | Kyriakides | |
| 2011/0030183 A1 | 2/2011 | Livingston et al. | |
| 2011/0031758 A1 | 2/2011 | Mitsuoka et al. | |
| 2011/0037191 A1 | 2/2011 | Stiesdal | |
| 2011/0045276 A1 | 2/2011 | Grove-Nielsen | |
| 2011/0103962 A1 | 5/2011 | Hayden et al. | |
| 2011/0114252 A1 | 5/2011 | Partington et al. | |
| 2011/0142662 A1 | 6/2011 | Fritz et al. | |
| 2011/0142663 A1 | 6/2011 | Gill | |
| 2011/0318186 A1 | 12/2011 | Kristensen et al. | |
| 2012/0034096 A1 | 2/2012 | Appleton | |
| 2012/0039720 A1 | 2/2012 | Bech | |
| 2012/0180582 A1 | 7/2012 | Piasecki | |
| 2012/0183408 A1 | 7/2012 | Noerlem | |
| 2012/0230830 A1 | 9/2012 | Lind et al. | |
| 2012/0237356 A1 | 9/2012 | Mironov | |
| 2012/0257982 A1 | 10/2012 | Frederiksen | |
| 2013/0012086 A1 | 1/2013 | Jones et al. | |
| 2013/0022466 A1 | 1/2013 | Laurberg | |
| 2013/0108453 A1 | 5/2013 | Baker et al. | |
| 2013/0149166 A1 | 6/2013 | Schibsbye | |
| 2013/0164133 A1 | 6/2013 | Grove-Neilsen | |
| 2013/0195661 A1 | 8/2013 | Lind et al. | |
| 2013/0224032 A1 | 8/2013 | Busbey et al. | |
| 2013/0231018 A1 | 9/2013 | Kruger et al. | |
| 2013/0333823 A1 | 12/2013 | Hedges et al. | |
| 2014/0003955 A1 | 1/2014 | Richter | |
| 2014/0003956 A1 | 1/2014 | Lull et al. | |
| 2014/0023513 A1 | 1/2014 | Johnson et al. | |
| 2014/0030094 A1 | 1/2014 | Dahl et al. | |
| 2014/0119936 A1 | 5/2014 | Dahl et al. | |
| 2014/0295187 A1 | 10/2014 | Jacobsen et al. | |
| 2014/0356182 A1 | 12/2014 | Obrecht | |
| 2015/0224760 A1 | 8/2015 | Eyb et al. | |
| 2015/0267679 A1 | 9/2015 | Canal Vila et al. | |
| 2016/0377050 A1 | 12/2016 | Caruso et al. | |
| 2019/0126521 A1 | 5/2019 | Yasuda et al. | |

FOREIGN PATENT DOCUMENTS

| | | |
|---|---|---|
| CA | 2526407 C | 12/2004 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| CN | 108698269 A | 10/2018 |
| DE | 19858152 A1 | 6/2000 |
| DE | 102011051172 A1 | 12/2012 |
| DK | 201270816 A | 1/2014 |
| DK | 201270818 A | 1/2014 |
| EP | 2113373 B1 | 1/2011 |
| EP | 2363602 A2 | 9/2011 |
| EP | 2434152 A2 | 3/2012 |
| EP | 2255957 B1 | 7/2013 |
| EP | 2617558 A1 | 7/2013 |
| EP | 2679804 A1 | 1/2014 |
| EP | 2679806 A1 | 1/2014 |
| EP | 2682256 A1 | 1/2014 |
| EP | 2687557 A1 | 1/2014 |
| EP | 2455419 B1 | 3/2014 |
| EP | 1808598 B1 | 4/2014 |
| EP | 2752577 A2 | 7/2014 |
| GB | 708342 * | 5/1954 |
| GB | 708342 A | 5/1954 |
| GB | 1055569 A * | 2/1963 |
| GB | 2451192 A | 1/2009 |
| GB | 2455044 A | 6/2009 |
| GB | 2464539 A | 4/2010 |
| GB | 2485453 A | 5/2012 |

(56) References Cited

FOREIGN PATENT DOCUMENTS

| | | | |
|---|---|---|---|
| JP | 2002137307 A | 5/2002 | |
| JP | 2007092716 A | 4/2007 | |
| JP | 3930200 B2 | 6/2007 | |
| JP | 2009235306 A | 10/2009 | |
| JP | 2014015567 A | 1/2014 | |
| JP | 5439412 B2 | 3/2014 | |
| WO | WO03082551 A1 | 10/2003 | |
| WO | WO2007/051465 A1 | 5/2007 | |
| WO | WO2008/086805 A2 | 7/2008 | |
| WO | WO2009/118545 A1 | 10/2009 | |
| WO | WO2010/025830 A2 | 3/2010 | |
| WO | WO2010/057502 A2 | 5/2010 | |
| WO | WO2010/083921 A2 | 7/2010 | |
| WO | WO2011/088835 A2 | 7/2011 | |
| WO | WO2011/098785 A2 | 8/2011 | |
| WO | WO2011/113812 A1 | 9/2011 | |
| WO | WO2012/010293 A1 | 1/2012 | |
| WO | WO2012/042261 A1 | 4/2012 | |
| WO | WO2012/140039 A2 | 10/2012 | |
| WO | WO2012/161741 A2 | 11/2012 | |
| WO | WO2013/007351 A1 | 1/2013 | |
| WO | WO2013/060582 A1 | 5/2013 | |
| WO | WO2013/087078 A1 | 6/2013 | |
| WO | WO2013/091639 A2 | 6/2013 | |
| WO | WO2013/178228 A1 | 12/2013 | |
| WO | WO2014/001537 A1 | 1/2014 | |
| WO | WO2014/044280 A1 | 3/2014 | |
| WO | WO2014/063944 A1 | 5/2014 | |
| WO | WO2014/079456 A1 | 5/2014 | |
| WO | WO2014/079565 A2 | 5/2014 | |
| WO | WO2015/015202 A1 | 2/2015 | |

* cited by examiner

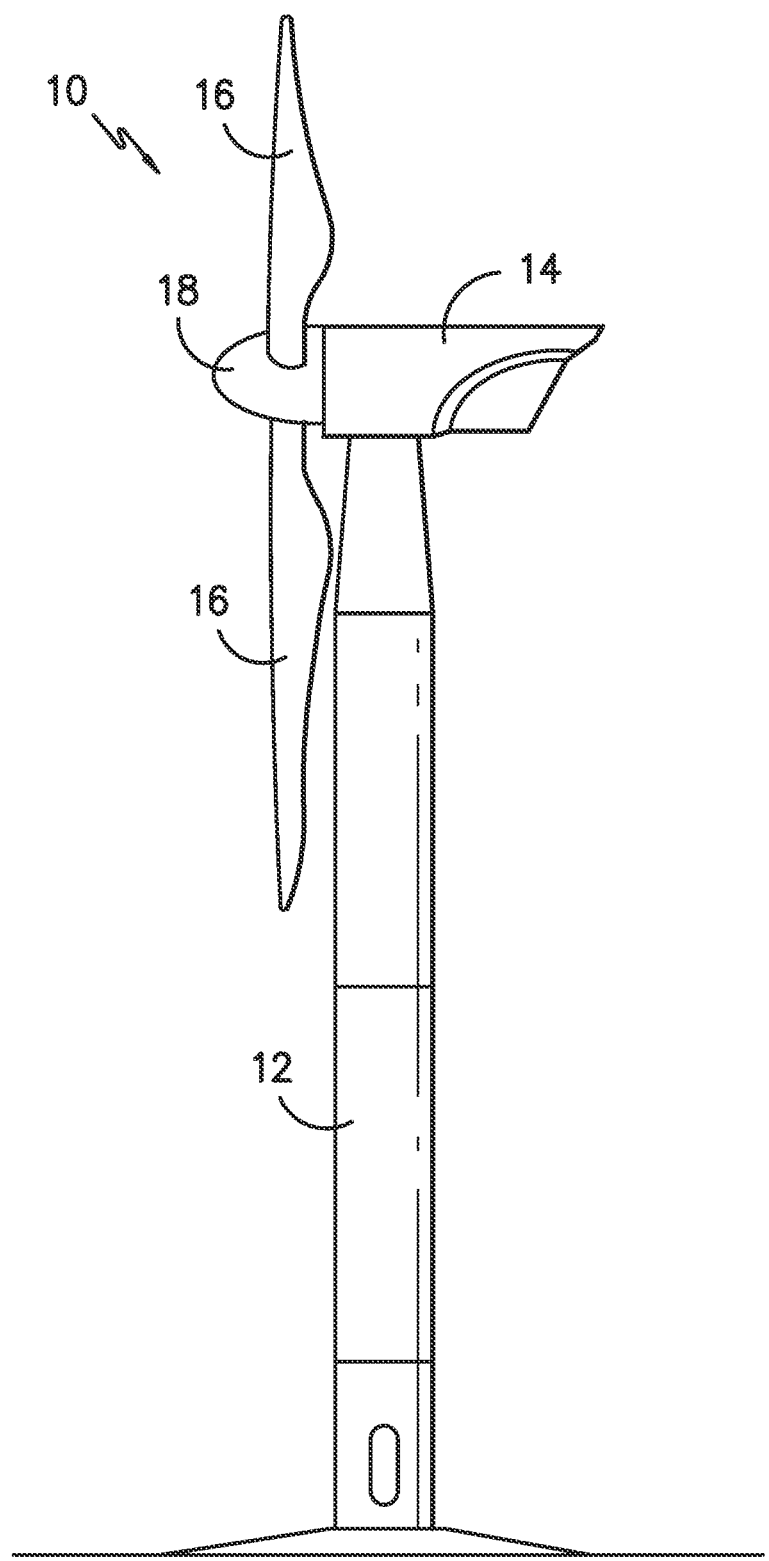
FIG. -1-

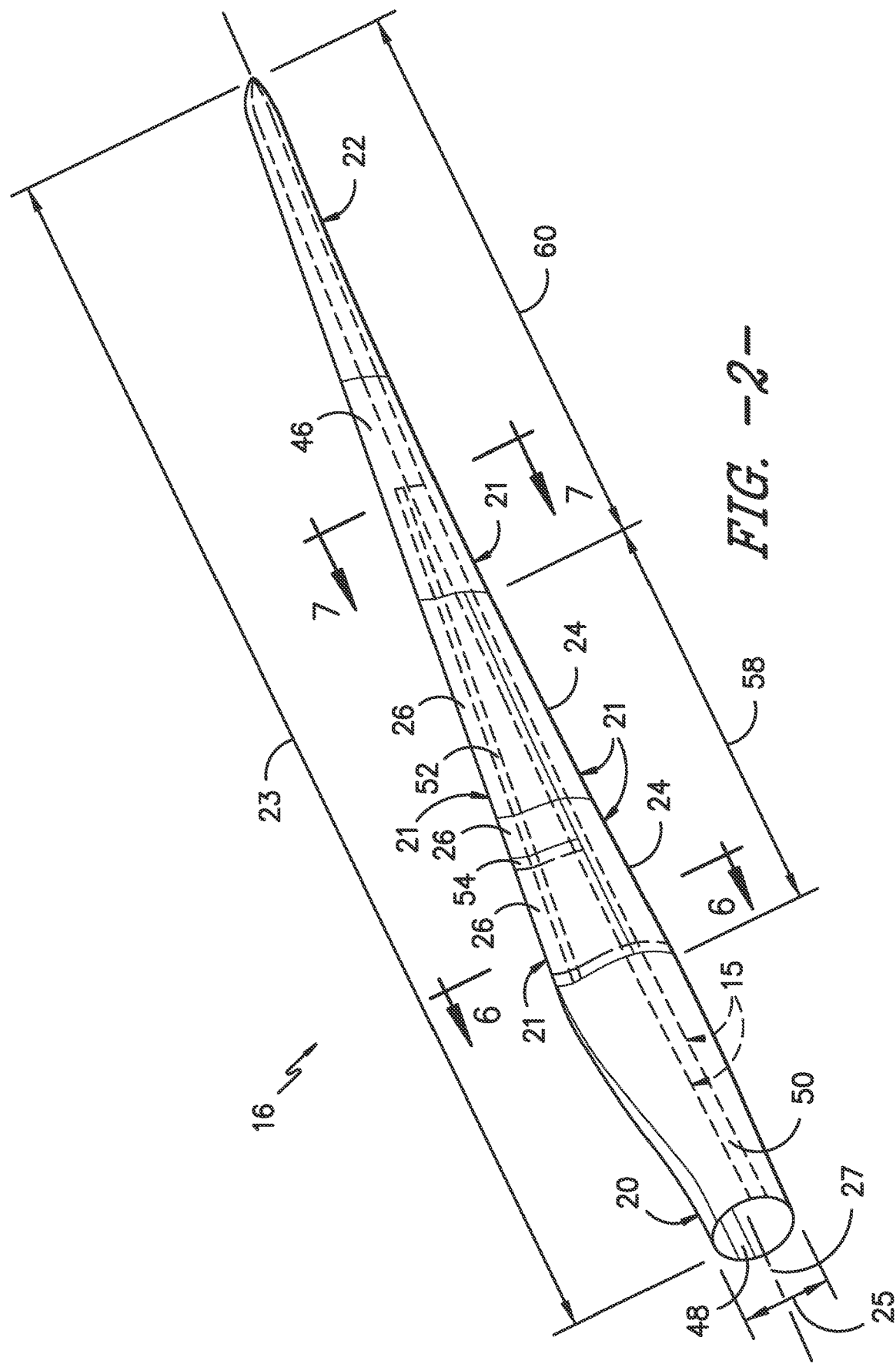
FIG. -2-

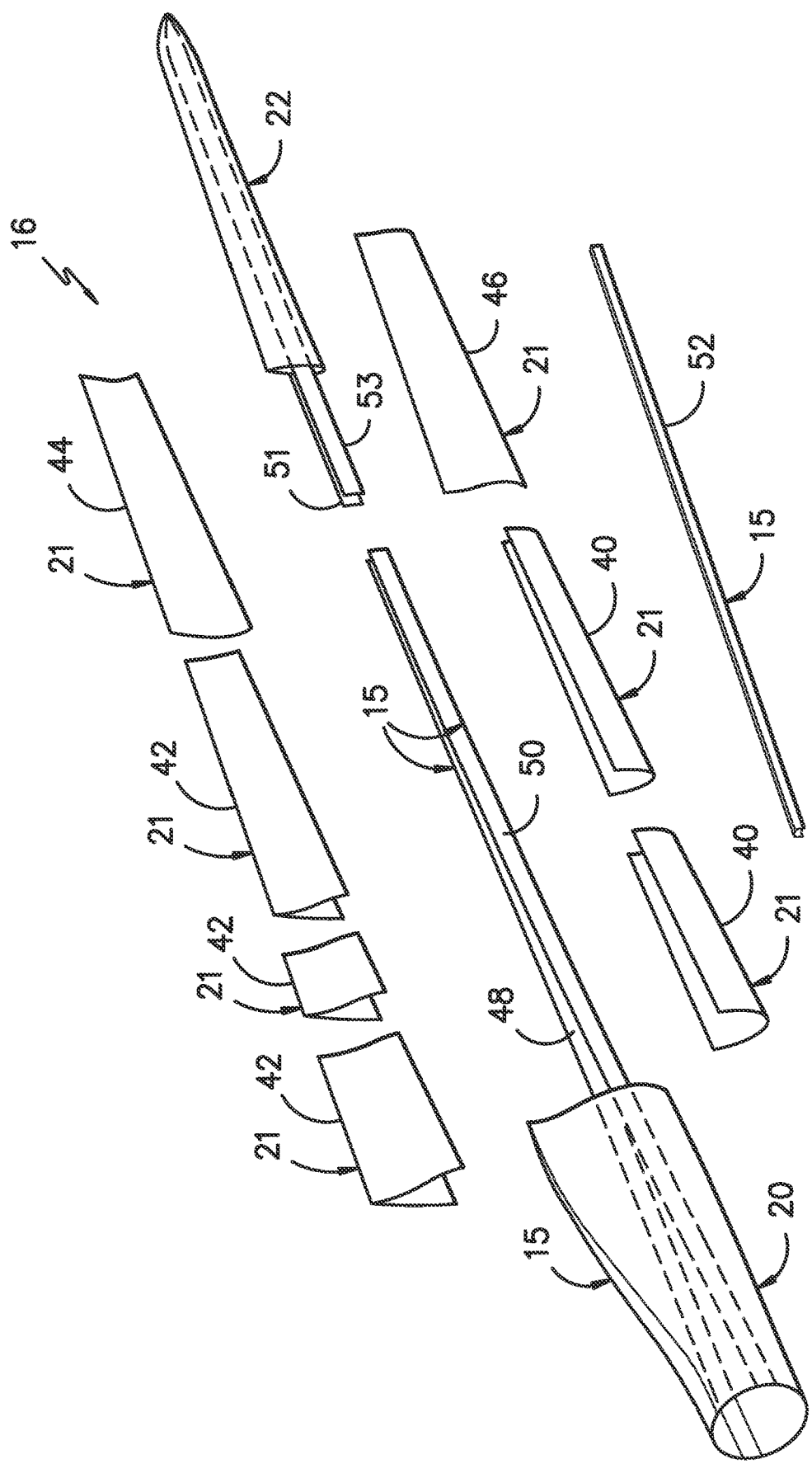

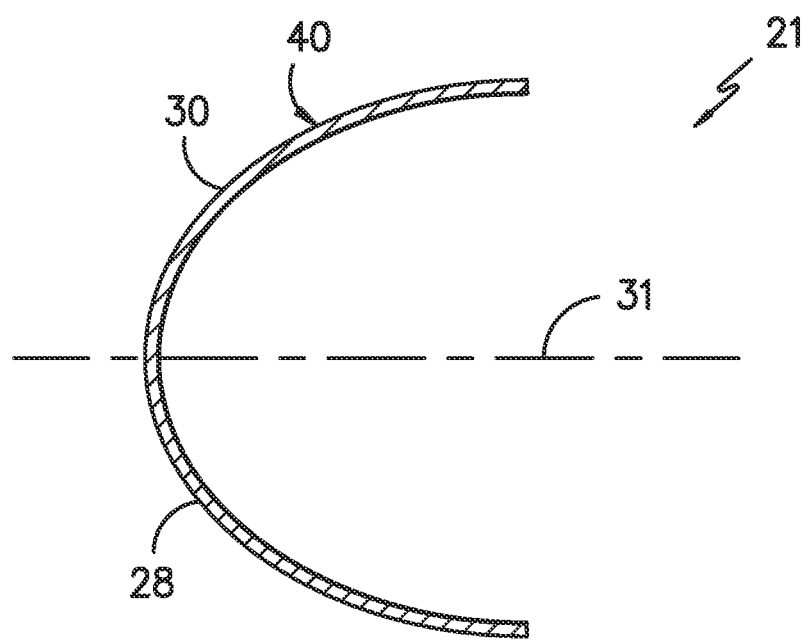
FIG. -4-
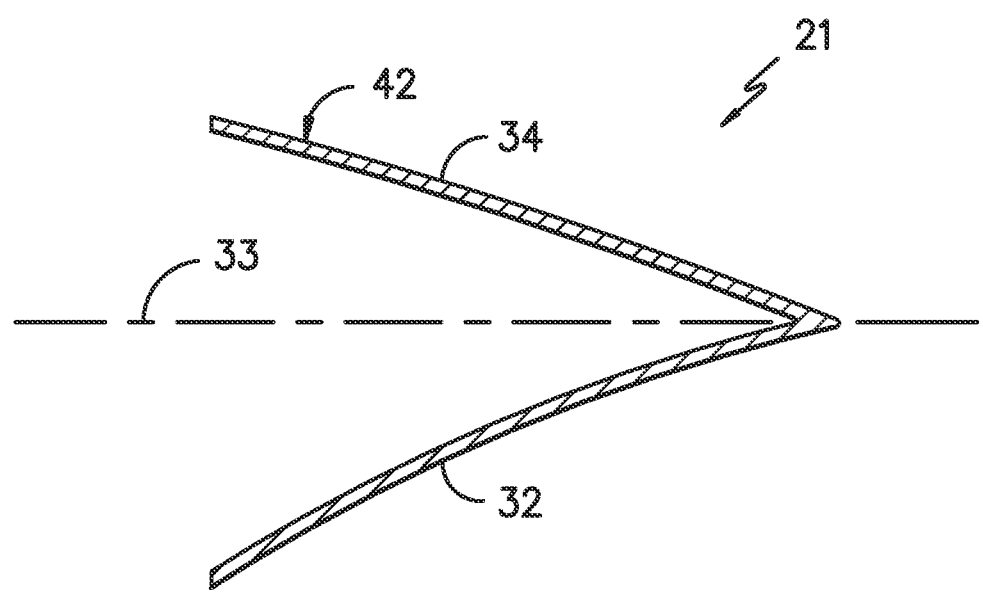
FIG. -5-

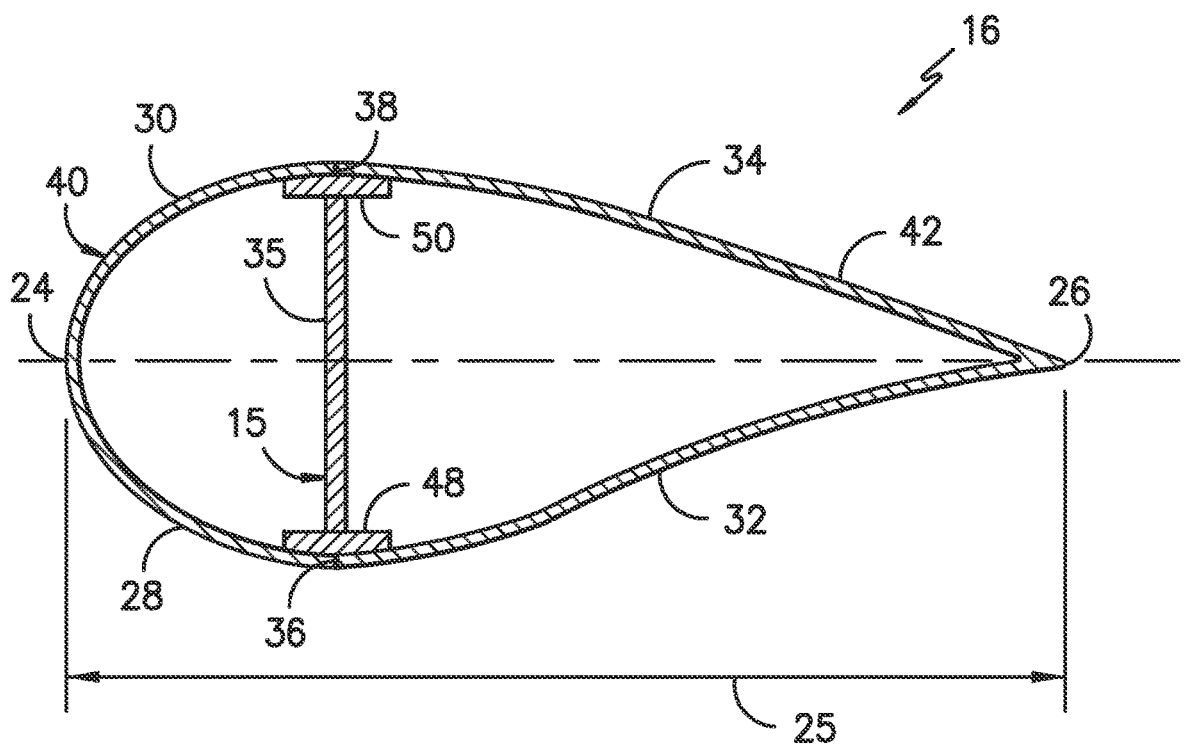
FIG. -6-
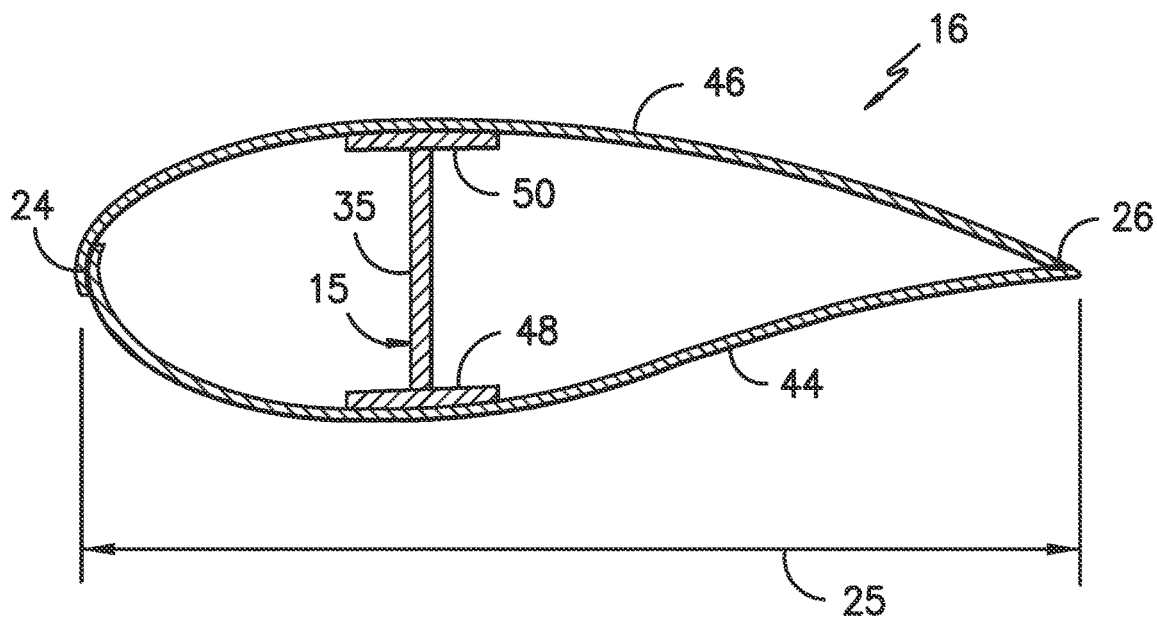
FIG. -7-

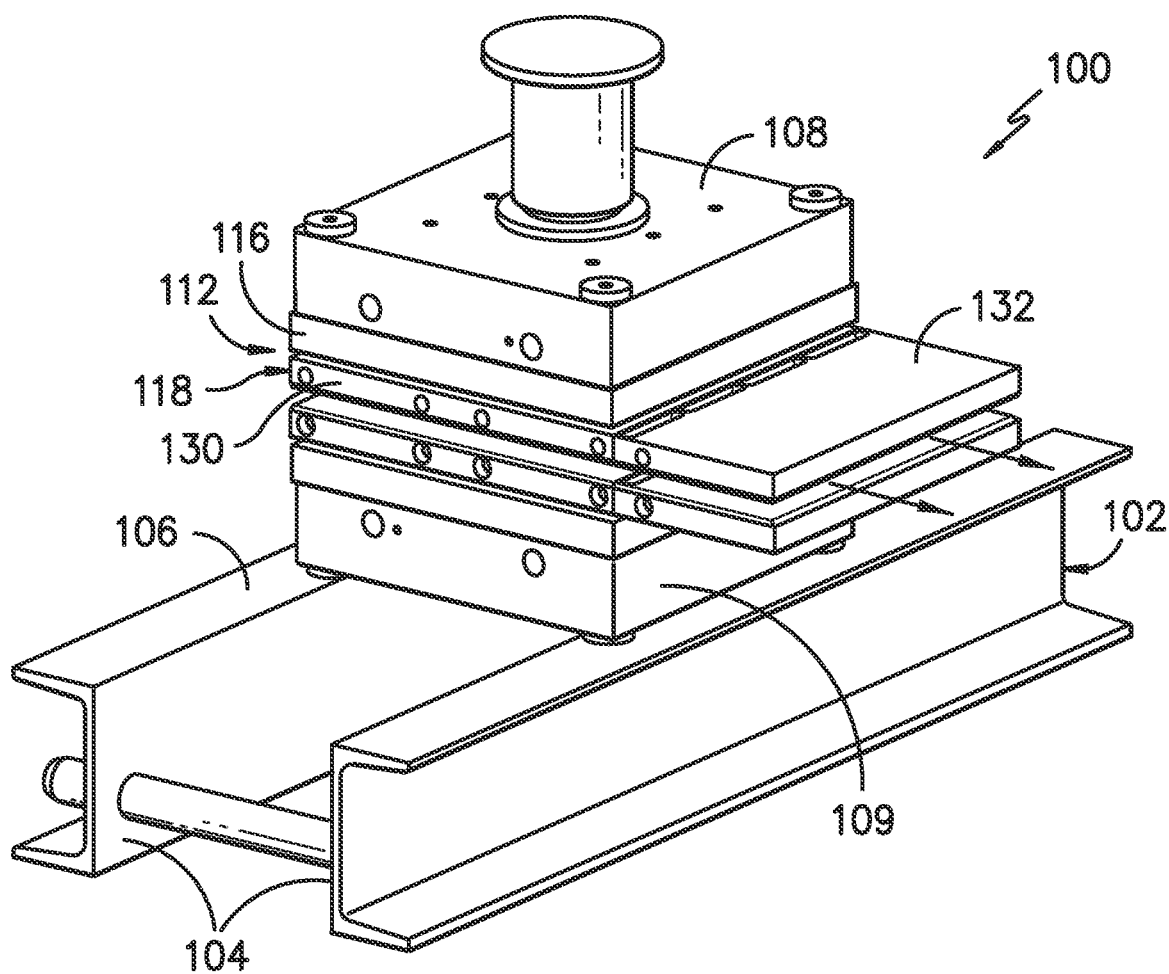
FIG. -8-

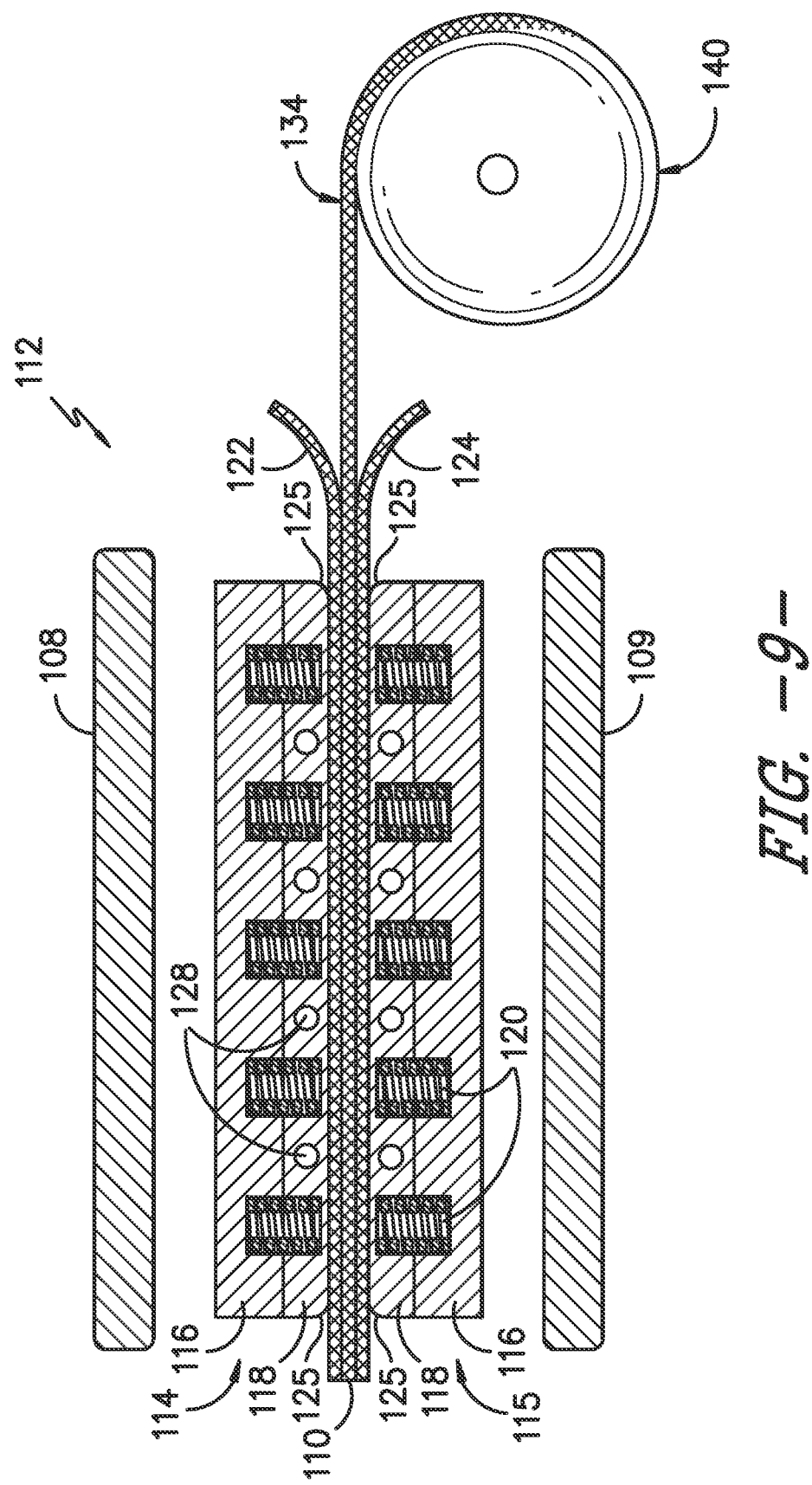
FIG. -9-

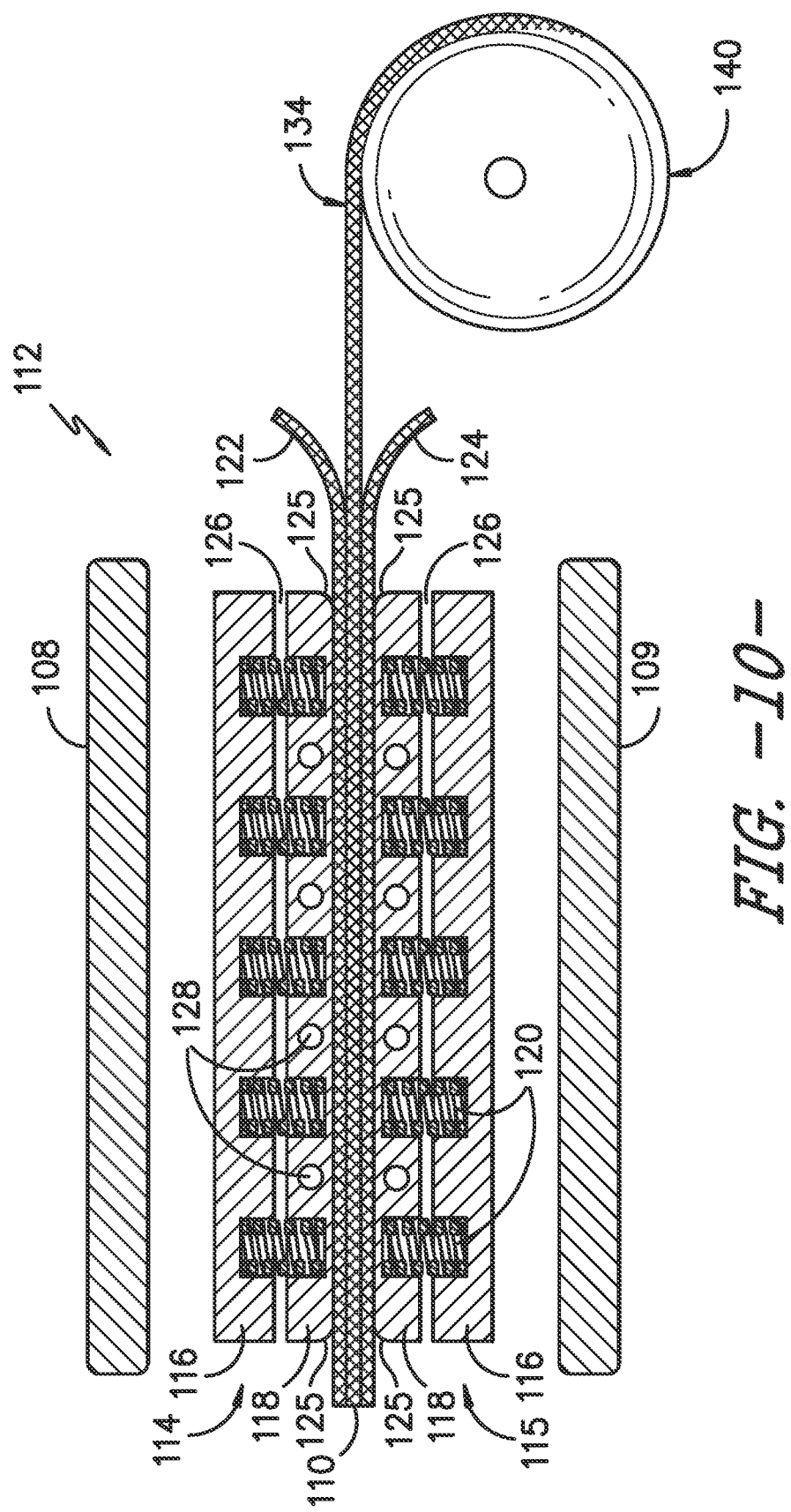
FIG. -10-

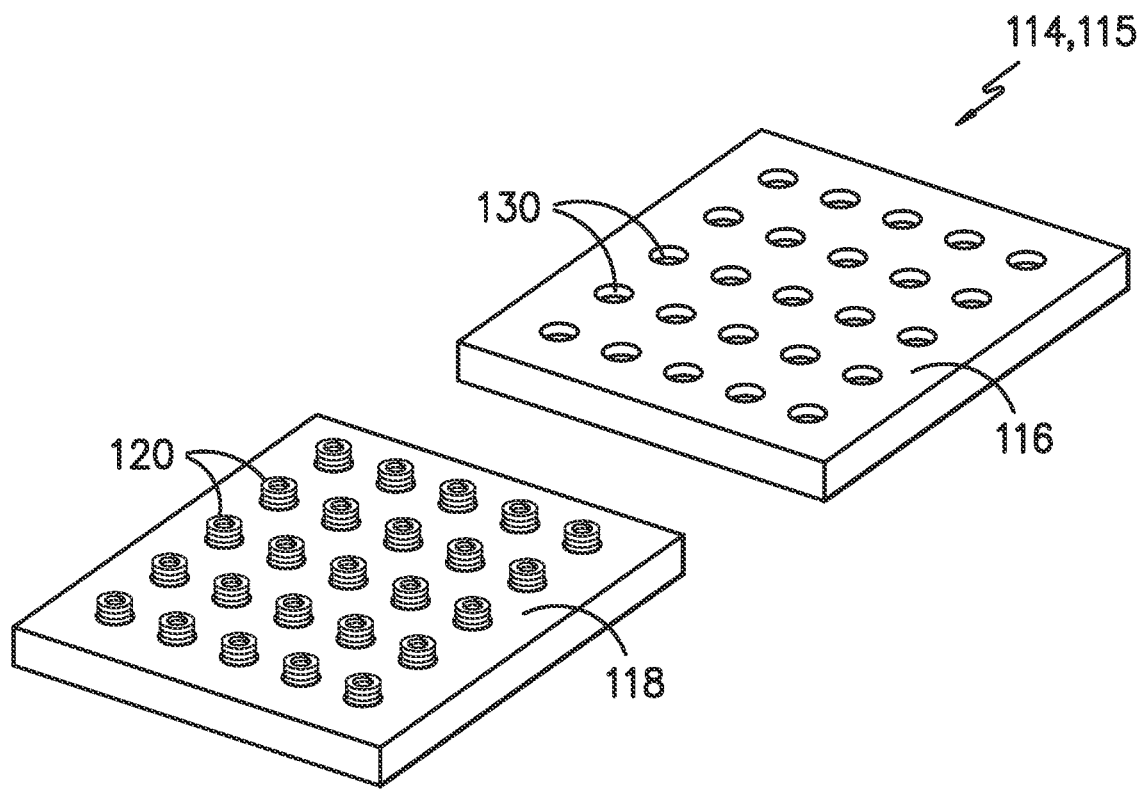
FIG. -11-
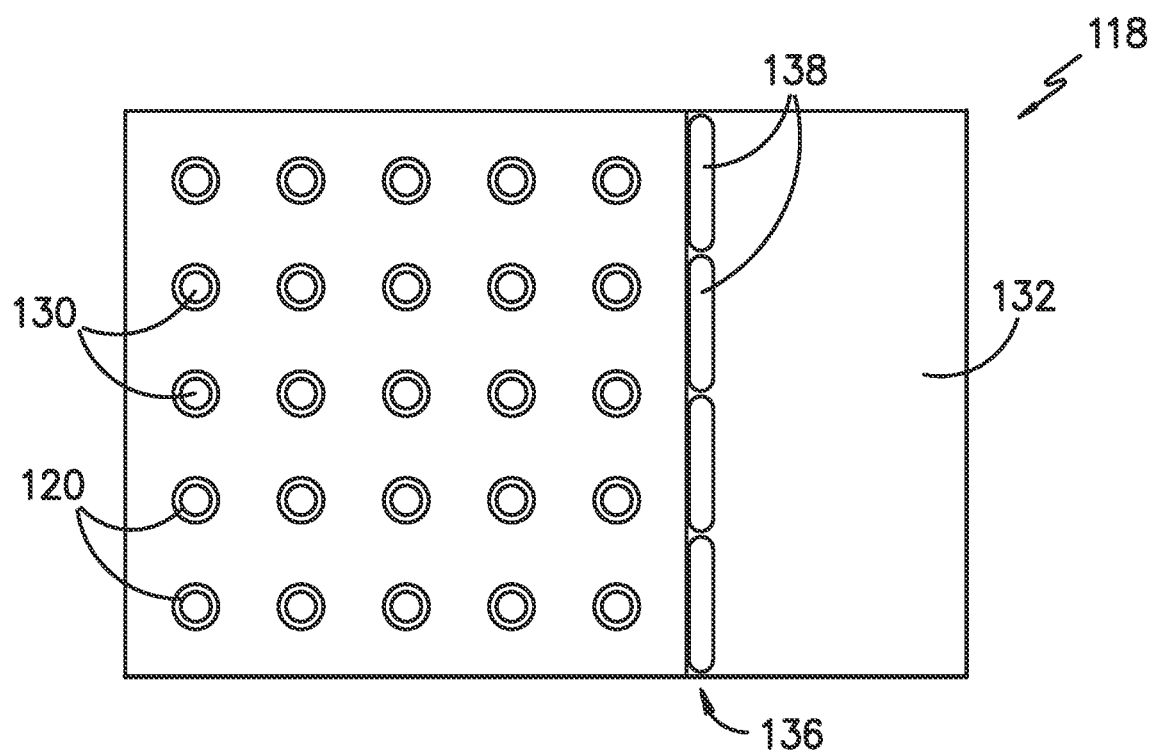
FIG. -12-

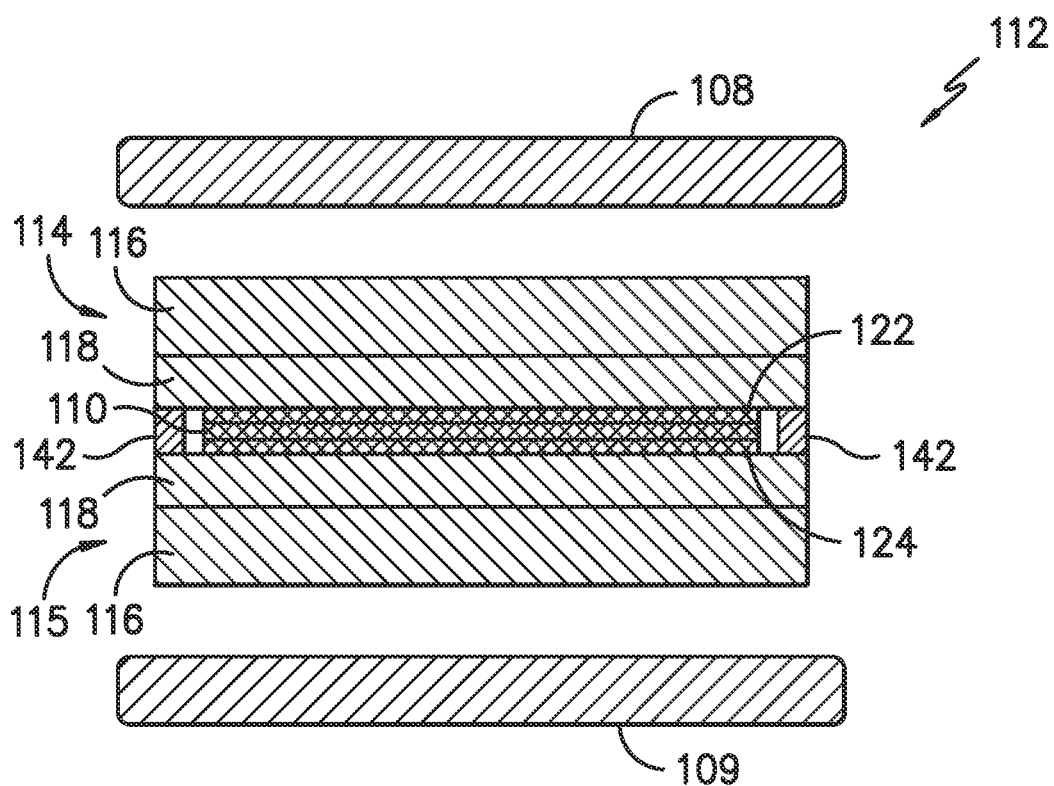
FIG. -13-

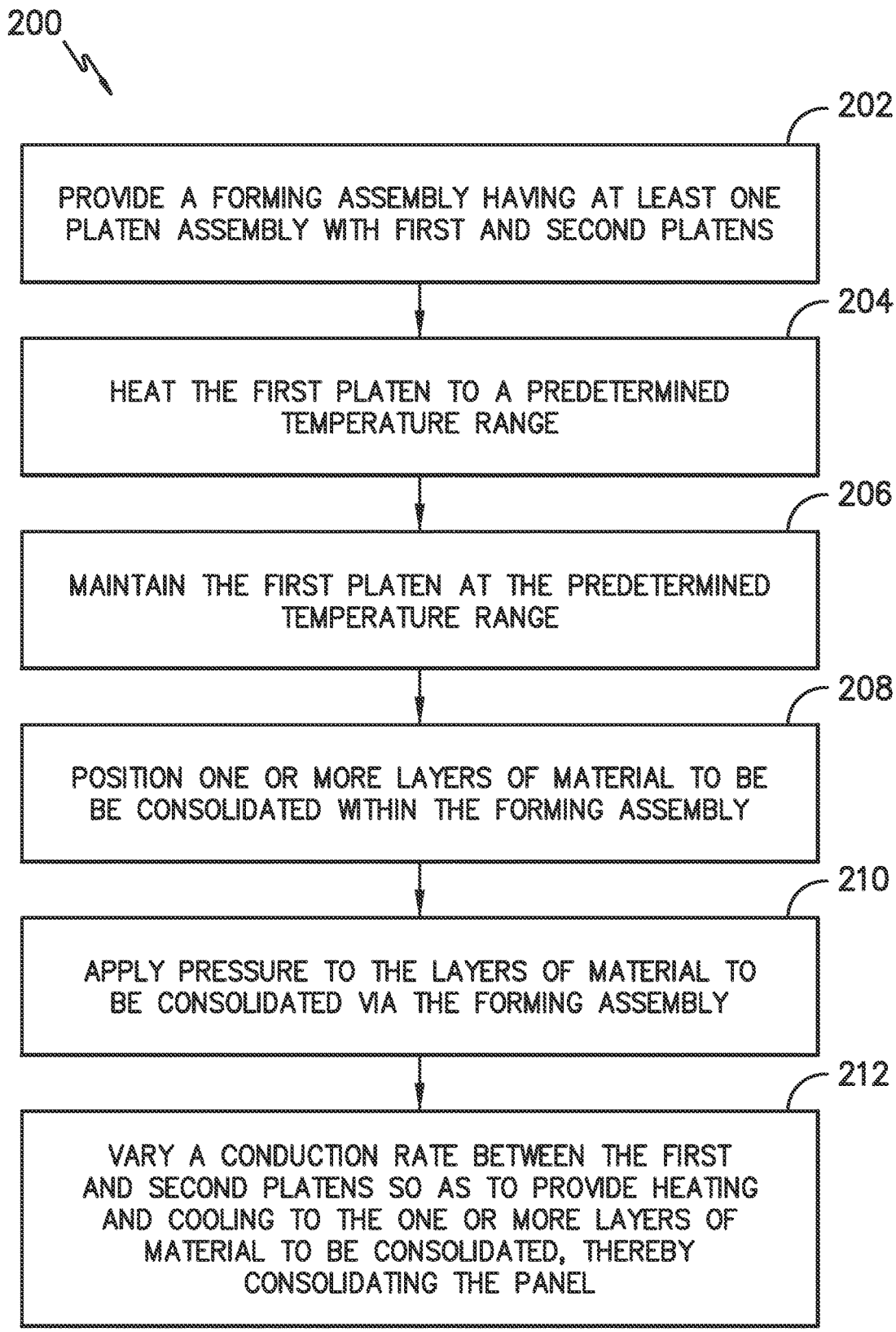
FIG. -14-

SYSTEM AND METHOD FOR MANUFACTURING PANELS FOR USE IN WIND TURBINE ROTOR BLADE COMPONENTS

FIELD

The present disclosure relates in general to wind turbines, and more particularly to systems and methods for manufacturing panels, e.g. that can be used to form wind turbine rotor blade components.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more exterior structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. Accordingly, conventional rotor blades generally have a sandwich panel configuration. As such, conventional blade manufacturing of large rotor blades involves high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

The necessary constituents for manufacturing composite laminates that can be used to construct the blade shells include temperature, pressure, and consolidation time. Thus, by applying and optimizing these three factors to a matrix of fibers and resin, a unified and homogeneous structure can be produced. Due to the large size of wind turbine rotor blades, however, achieving all three factors simultaneously can be difficult or cost prohibitive.

For example, static mechanical hydraulic/pneumatic presses can be insufficient for manufacturing large composite laminates for a number of reasons. For instance, the non-continuous nature of the press means that the press plates must encompass the entire desired size of the laminate. With the targeted size and pressure needed for rotor blades, a machine weighing hundreds of tons would be required, which is impractical and/or uneconomical to operate. The entire press plates would be required to thermally cycle between hot/cold temperatures to consolidate the laminate structure. Changing the temperature of this amount of mass can be impractical and/or uneconomical. For example, multiple presses can be employed, with one being held at a high temperature and another at room temperature. However, this scenario introduces the possibility of fibers being distorted as the material is moved between the hot and cold presses. This scenario also has a very high capital equipment cost.

In addition, due to the large surface area, the press plates must necessarily be quite thick (e.g. greater than 25 millimeters) and made of steel. This creates an enormous thermal mass when the plate is at its operating temperature of 300° C. Even if the thermodynamics allowed for heating this mass, it would be very wasteful of energy and not economically attractive.

In view of the foregoing, the art is continually seeking improved systems and methods for manufacturing panels, such as large composite laminates e.g. that can be used to form wind turbine rotor blade shells.

BRIEF DESCRIPTION

Aspects and advantages of the invention will be set forth in part in the following description, or may be obvious from the description, or may be learned through practice of the invention.

In one aspect, the present disclosure is directed to a system for manufacturing a panel. The system includes a forming assembly having opposing press plates and at least one platen assembly arranged between the opposing press plates. The platen assembly includes first and second platens connected together via at least one elastic deformable member. Further, the forming assembly is operable in a heating mode and a cooling mode. Moreover, the first platen is maintained at a predetermined temperature during each of the heating and cooling modes. During the heating mode, the elastic deformable member(s) is compressed such that the first and second platens contact each other. As such, one or more layers of material to be consolidated is held by the forming assembly as the forming assembly applies heat and pressure to the layer(s) of material to be consolidated, thereby consolidating the panel.

In an embodiment, during the cooling mode, the elastic deformable member(s) is relaxed such that the first and second platens are spaced apart from each other via an air gap. For example, in one embodiment, the air gap ranges from about 1 millimeter (mm) to about 25 mm.

In another embodiment, the second platen may include a plurality of channels for circulating a cooling fluid therethrough during the cooling mode. As such, circulating the cooling fluid through the channels lowers a temperature of the second platen.

In further embodiments, the second platen may include, at least, a first portion and a second portion. The second portions may extend outside of the opposing press plates of the forming assembly, e.g. such that the second portion can be independently cooled with respect to the first portion. In some instances, therefore, the second portion can provide a cold region to prevent heat transfer into the panel. In additional embodiments, the second platen may include a thermal barrier between the first and second regions. For example, in one embodiment, the thermal barrier may include a plurality of air gaps.

In another embodiment, the forming assembly may include a plurality of elastic deformable members connected between the first and second platens. In such embodiments, each of the plurality of elastic deformable members may be recessed within at least one of the first and second platens.

In several embodiments, the system may include first and second caul plates. Thus, in an embodiment, the system may include a first platen assembly arranged above the first and second caul plates and a second platen assembly arranged below the first and second caul plates, with each of the first and second platen assemblies including the first and second platens.

In another embodiment, wherein the first and second caul plates are continuous belts that rotate through the heating and cooling assemblies. In further embodiments, the second platens may have rounded edges. Further, in an embodiment, the opposing press plates may be integral with the first platens of the first and second platen assemblies.

In addition embodiments, the system may include one or more spacers for controlling a final thickness of the panel, the one or more spacers positioned within the forming assembly.

In an embodiment, the system may also include a spool, wherein, upon cooling, the panel may be separated from the first and second caul plates and spooled onto the spool.

In another aspect, the present disclosure is directed to a method for manufacturing a panel. The method includes providing a forming assembly having at least one platen assembly with first and second platens. Further, the method includes heating the first platen to a predetermined temperature range. Moreover, the method includes maintaining the first platen at the predetermined temperature range. In addition, the method includes positioning one or more layers of material to be consolidated within the forming assembly. The method also includes applying pressure to the layers of material to be consolidated via the forming assembly. Thus, the method further includes varying a conduction rate between the first and second platens so as to provide heating and cooling to the one or more the layers of material to be consolidated, thereby consolidating the panel.

In an embodiment, varying the conduction rate between the first and second platens may include coupling the first and second platens together via a variable heat transfer mechanism and during a heating mode of the forming assembly, adjusting the variable heat transfer mechanism to increase heat transfer from the first platen to the second platen so as to heat the layers of material to be consolidated, thereby consolidating the panel.

In another embodiment, during a cooling mode of the forming assembly, the method may include adjusting the variable heat transfer mechanism to reduce heat transfer from the first platen to the second platen and circulating a cooling fluid through one or more channels of the second platen to cool the second platen and the one or more layers of material to be consolidated.

In several embodiments, the variable heat transfer mechanism may include at least one elastic deformable member. Thus, in certain embodiments, adjusting the variable heat transfer mechanism to increase the heat transfer from the first platen to the second platen during the heating mode may include compressing the at least one elastic deformable member such that the first and second platens contact each other. In addition, in another embodiment, adjusting the variable heat transfer mechanism to reduce the heat transfer from the first platen to the second platen during the cooling mode may include relaxing the at least one elastic deformable member such that the first and second platens are spaced apart from each other via an air gap. It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure;

FIG. 7 illustrates a cross-sectional view of the modular rotor blade of FIG. 2 according to the present disclosure;

FIG. 8 illustrates a perspective view of one embodiment of a system for manufacturing a panel according to the present disclosure;

FIG. 9 illustrates a cross-sectional view of the system of FIG. 8 in a heating mode;

FIG. 10 illustrates a cross-sectional view of the system of FIG. 8 in a cooling mode;

FIG. 11 illustrates perspective views of one embodiment of first and second platens of a system for manufacturing a panel according to the present disclosure;

FIG. 12 illustrates a top view of one embodiment of a second platen of a system for manufacturing a panel according to the present disclosure; and FIG. 13 illustrates a cross-sectional, end view of another embodiment of a system for manufacturing a panel according to the present disclosure;

FIG. 14 illustrates a flow diagram of one embodiment of a method for manufacturing a panel for a rotor blade component according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for manufacturing panels, such as large composite laminate panels, which may be flat or curved. Such panels, for example, may be used in wind turbine rotor blade applications (e.g. by shaping the flat panels into curved panels or initially making curved panels), transportation applications, as well as any other industry that can benefit from the use of such panels. Accordingly, in an embodiment, a plurality of fiber and/or resin layers may be stacked together and placed between upper and lower caul plates (steel/titanium/polymer composite/other). This sandwiched assembly is placed in a forming assembly between opposing press plates. A simultaneous application of high temperature (e.g. 300° C.) and pressure (e.g. from about 30 psi to about 150 psi) can be applied for a period of time (e.g. 30 seconds to 500 seconds) to the layers.

More specifically, in an embodiment, a high thermal mass platen is heated. The high thermal mass block is also coupled to a very low mass platen through a variable heat transfer mechanism. During the heating mode, the variable heat transfer mechanism can be adjusted to increase heat transfer from the high thermal mass to the low thermal mass that is in contact with the laminate. Thus, in an embodiment, the resin infuses through the fiberglass reinforcement. After a sufficient period of time, the laminate reaches a fully wet out condition. During the cooling mode, the variable heat transfer mechanism can be adjusted to reduce the heat transfer from the high thermal mass to the low thermal mass, while also maintaining a constant pressure. A cooling fluid may also be circulated through the low-mass platen to quickly lower the temperature of the laminate. Thus, the laminate can be cooled as quickly as possible, while maintaining a high pressure to ensure that all voids are minimized. After the laminate has cooled to below the softening point of the material (e.g. 60° C.), the laminate may be separated from the caul plates and spooled up. The cooling fluid may also be expelled from the platen. After the cooling fluid has been evacuated completely, the system is then ready to begin another heating cycle. Infinite length laminates can be produced in this manner. Thus, the present disclosure is configured to quickly heat the laminate from room temperature to a high temperature and back to room temperature, all while maintaining application of pressure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades as well as other applications such as the transportation/automotive industry. Further, the methods described herein may also apply to the manufacturing of any similar structure that benefits from printing a structure directly to blade skins.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic materials as described herein generally encompass a plastic material or polymer that is reversible in nature. Further, the thermoplastic materials as described herein may be in any suitable form such as film, nonwoven, powder, or similar. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, basalt fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8-14, the present disclosure is directed to systems and method for manufacturing a panel that can be used in various wind turbine components, such as the rotor blade shell described herein. For example, as shown in FIG. 8, a perspective view of one embodiment of a system 100 for manufacturing a panel for a rotor blade component is illustrated. FIG. 9 illustrates a cross-sectional view of the system 100 of FIG. 8 during a heating mode. FIG. 10 illustrates a perspective view of the system 100 of FIG. 8 during a cooling mode. FIG. 11 illustrates perspective views of one embodiment of the first and second platens 116, 118 of the system 100 according to the present disclosure. FIG. 12 illustrates a top view of one of the platens 116, 118 of the system 100 according to the present disclosure. FIG. 13 illustrates a cross-sectional end view of another embodiment of the system 100 for manufacturing a panel for a rotor blade component. FIG. 14 illustrates a flow diagram of one embodiment of a method 200 for manufacturing a panel according to the present disclosure.

As shown in FIG. 8, the system 100 includes a support frame 102 having a table-like configuration with legs 104 and a support surface 106. It should be further understood that the support frame 102 may have any other suitable configuration and may also be eliminated altogether. Referring to FIGS. 8-10, the system 100 also includes a forming assembly 112. More particularly, as shown, the forming assembly may include opposing press plates 108, 109 (e.g. hydraulic or pneumatic presses) and at least one platen assembly 114, 115 arranged between the opposing press plates 108, 109.

In addition, as shown in FIGS. 9 and 10, the system 100 may optionally include first and second caul plates 122, 124 for sandwiching around one or more layers 110 of material to be consolidated as the layers 110 are melted and cooled via the forming assembly 112. In one embodiment, the first and second caul plates 122, 124 may be sized similar to a desired shape of the panel to be formed. Alternatively, the first and second caul plates 122, 124 may be continuous belts that rotate through the forming assembly 112. In such embodiments, the first and second caul plates 122, 124 can be rotated through the forming assembly 112 and stopped (i.e. while the material is held under pressure) and started as needed. In certain embodiments, the first and second caul plates 122, 124 may be constructed of steel, titanium, a polymer composite, or similar.

In one embodiment, the one or more layers 110 of material to be consolidated may include one or more fiber and/or resin layers. Thus, in such embodiments, it should be understood that the resin within the one or more fiber-resin layers 110 may be a thermoplastic material or a thermoset material.

Referring to FIGS. 8-10, as mentioned, the forming assembly 112 may also include one or more platen assemblies 114, 115. For example, as shown in the illustrated embodiment, the forming assembly 112 may include a first platen assembly 114 and a second platen assembly 115. Thus, as shown, the first platen assembly 114 may be arranged above the first and second caul plates 122, 124 and the second platen assembly 115 may be arranged below the first and second caul plates 122, 124. In another embodiment, the forming assembly 112 may include only one platen assembly. In an embodiment, the opposing press plates 108, 109 may be separate from the first platens of the first and second platen assemblies 114, 115 or integral with the first platens of the first and second platen assemblies 114, 115.

Further, as shown in FIGS. 8-11, the platen assemblies 114, 115 described herein may include first and second platens 116, 118 connected together via at least one elastic deformable member 120. In particular, as shown, the forming assembly 112 may include a plurality of elastic deformable members 120 connected between the first and second platens 116, 118.

In one embodiment, for example, the elastic deformable member(s) 120 may be a spring, as well as any other suitable material that does not plastically deform under a load and that can handle a wide temperature range. In such embodiments, each of the plurality of elastic deformable members 120 may be recessed within at least one of the first and second platens 116, 118, e.g. via one or more cavities formed therein (FIG. 11). Accordingly, by recessing the springs 120 within the platens 116, 118, the length of the spring enables the use of a long spring. Thus, the spring(s) 120 can still maintain a high pressure when the spring is in its semi-relaxed air gap cooling mode.

Moreover, the forming assembly 112 is operable in a heating mode (FIG. 9) and a cooling mode (FIG. 10). As such, the first platens 116 can be maintained at a predetermined temperature range during each of the heating and cooling modes. For example, in one embodiment, the predetermined temperature range may range from about 300° C. to about 400° C. Thus, as shown in FIG. 9, during the heating mode, the elastic deformable members 120 may be compressed such that the first and second platens 116, 118 contact each other. As such, the layers to be consolidated 110 may be placed between the first and second caul plates 122, 124 and held by the forming assembly 112 as the forming assembly 112 applies heat and pressure to the layer 110. For example, in one embodiment, the forming assembly 112 may hold the layers 110 apply heat and pressure for about 3 minutes to about 5 minutes, or any suitable time period e.g. that allows the resin to begin to melt and flow into and among the fibers.

As shown in FIG. 10, during the cooling mode, the elastic deformable members 120 may then be relaxed (e.g. extended) such that the first and second platens 116, 118 are spaced apart from each other via an air gap 126. For example, in one embodiment, the air gap 126 may range from about 1 millimeters (mm) to about 25 mm. In such instances, the first platens 116 are still maintained at the elevated temperature range, however, the air gap 126 allows the second platens 118 (which are in contact with the caul plates 122, 124) to cool.

In addition, as shown, the second platens 118 may include a plurality of channels 128 for circulating a cooling fluid therethrough during the cooling mode. As such, circulating the cooling fluid through the channels 128 is also configured to lower a temperature of the second platens 118 to a cooled temperature range. In particular embodiments, the cooled temperature range may range from about 50° C. to about 80° C. It should be understood, however, that the cooled temperature range may vary depending on the type of layers of material that are used. In addition, when the cooling mode is complete, the forming assembly 112 may be purged (e.g. via compressed air and valves) to eject the cooling fluid so as to eliminate any residual liquid remaining in the forming assembly 112. In addition, in an embodiment, as shown in FIGS. 9 and 10, the second platens 118 may have one or more rounded edges 125 so as to prevent creasing of the caul plates 122, 124 and/or damaging the layers 110 of material to be consolidated.

Moreover, in the cooling mode, the elastic deformable members 120 are configured to maintain the pressure against the caul plates 122, 124. In such embodiments, by using the recessed elastic deformable member(s) 120 described herein, a very effective insulation zone may be created on demand between the hot zone and cold zone of the press (i.e. the first and second platens 116, 118). In other words, a "heat valve" may be created between the first and second platens 116, 118, which allows the heat transfer of the interface to be altered by an order of magnitude. Further, the elastic deformable member(s) 120 allow for a constant pressure to be exerted on the layers 110 of material and/or the caul plates 122, 124, but also allows for the press to be rapidly cycled between heating and cooling modes.

Referring now to FIGS. 8 and 12, in certain embodiments, the second platens 118 may each include, at least, a first portion 130 and a second portion 132. Accordingly, as shown, the second portions 132 may extend outside of the opposing press plates 108, 109 of the forming assembly 112 to provide a cold region (i.e. the second portion 132) to prevent heat transfer into the panel 134. In such embodiments, as shown in FIG. 12, the second platen 118 may include a thermal barrier 136 between the first and second regions. For example, as shown in the illustrated embodiment, the thermal barrier 136 may include a plurality of air gaps 138 to allow water (or any suitable cooling fluid) to flow between the first and second portions 130, 132. It should be understood that the second platens 118 may further include additional portions in addition to the first ad second portions 130, 132.

Referring back to FIGS. 9 and 10, the system 100 may also include a spool 140. As such, upon cooling, the panel 134 may be separated from the first and second caul plates 122, 124 (where used) and spooled onto the spool. In another embodiment, where the first and second caul plates 122, 124 are not used, the panel 134 may simply be spooled onto the spool 140 directly from the forming assembly 112.

In yet another embodiment, it should be understood that multiple systems 100 may be aligned and used together to form large panels. For example, in an embodiment, because very long panels can be desirable for wind blade applications, the cost and cycle time of a process with a single system 100 can be improved by the use of multiple systems 100. For example, if a 12 meter (m)×2 m wide panels is desired, six systems with a plate size of 2.25 m×1.25 m can be used and spaced apart with approximately 1 m between each system. Further, a caul plate set of at least 12 m×2 m wide containing layers of dry fiber fabric and thermoplastic resin can be placed in the system and hot/cold pressed to consolidate every other 1.25 m length of the 12 m length. Then, the presses can be opened and the caul plates can be moved approximately 1.125 m in the length direction and the hot/cold press cycle is repeated. This ensures an overlap between the zones of previously consolidated material. At this point, the entire 12-meter long sheet will have been processed in two cycles versus 12 cycles if there was only one system.

Referring now to FIG. 13, as mentioned, a cross-sectional end view of another embodiment of the system 100 for manufacturing a panel for a rotor blade component is illustrated. More specifically, as shown, one or more spacers 142 may be provided to control the final thickness of the panel. By adding spacers 142, e.g. outside of the caul plates 122, 124 but inside the extent of the second platen 118, the system 100 prevents over-compressing the panel 134 and overly squeezing material beyond the fabric being filled.

Referring now to FIG. 14, the present disclosure is directed to methods for manufacturing a panel, e.g. for a rotor blade shell and/or blade add-ons. More specifically, as shown, a flow diagram of one embodiment of a method 200 for manufacturing a panel is illustrated. As such, in certain embodiments, the rotor blade shell 21 may define a pressure side shell, a suction side shell, a trailing edge segment, a leading edge segment, or combinations thereof. In general, the method 200 is described herein as implemented for manufacturing panels used in forming the rotor blade shells 21 described above. However, it should be appreciated that the disclosed method 200 may be used to manufacture any other panel. In addition, although FIG. 14 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes providing the forming assembly 112 having at least one platen assembly 114, 115 with first and second platens 116, 118. As shown at (204), the method 200 includes heating the first platen 116 to a predetermined temperature range. As shown at (206), the method 200 includes maintaining the first platen 116 at the predetermined temperature range. As shown at (208), the method 200 includes positioning one or more layers 110 of material to be consolidated within the forming assembly 112. As shown at (210), the method 200 includes applying pressure to the one or more layers 110 of material to be consolidated via the forming assembly 112.

As shown at (212), the method 200 includes varying a conduction rate between the first and second platens 116, 118 so as to provide heating and cooling to the one or more layers 110 of material to be consolidated, thereby consolidating the panel 134. More specifically, in an embodiment, the conduction rate between the first and second platens 116, 118 may be varied by coupling the first and second platens 116, 118 together via a variable heat transfer mechanism. Accordingly, during a heating mode of the forming assembly 112, the variable heat transfer mechanism may be adjusted to increase heat transfer from the first platen 116 to the second platen 118 so as to heat the one or more layers 110 of material to be consolidated, thereby consolidating the panel 134. For example, in one embodiment, the first platen 116 may be heated and maintained at a high temperature range (such as from about 325° C. to about 400° C.). Thus, the contacting first and second platens 116, 118 provide an increased heat transfer rate to the layer(s) 110 of material to be consolidated.

In an embodiment, as mentioned, the variable heat transfer mechanism may include at least one elastic deformable member 120. Thus, in certain embodiments, adjusting the variable heat transfer mechanism to allow the greater rate of heat transfer from the first platen 116 to the second platen 118 during the heating mode may include compressing the elastic deformable member(s) 120 such that the first and second platens 116, 118 contact each other (FIG. 9).

In another embodiment, during a cooling mode of the forming assembly 112, the method 200 may include adjusting the variable heat transfer mechanism to reduce the heat transfer from the first platen 116 to the second platen 118 so as to cool the second platen 118 and the one or more fiber-resin layers 110. More specifically, in one embodiment, the elastic deformable member(s) 120 may be relaxed/extended such that the first and second platens 116, 118 are spaced apart from each other via an air gap 126 (FIG. 10) so as to provide quick cooling to the second platen 118.

In further embodiments, the method 200 may also include circulating a cooling fluid through one or more channels 128 of the second platen 118 to further cool the second platen 118 and the one or more fiber-resin layers 110 to a cooled temperature (e.g. to about 50° C. up to about 80° C.).

Various aspects and embodiments of the present invention are defined by the following numbered clauses:

Clause 1. A system for manufacturing a panel, the system comprising: a forming assembly comprising opposing press plates and at least one platen assembly arranged between the opposing press plates, the at least one platen assembly comprising first and second platens connected together via at least one elastic deformable member, the forming assembly operable in a heating mode and a cooling mode, the first platen being maintained at a predetermined temperature range during each of the heating and cooling modes; wherein, during the heating mode, the at least one elastic deformable member is compressed such that the first and second platens contact each other, and wherein one or more layers of material to be consolidated is held by the forming assembly as the forming assembly applies heat and pressure to the one or more layers of material to be consolidated, thereby consolidating the panel.

Clause 2. The system of Clause 1, wherein, during the cooling mode, the at least one elastic deformable member is relaxed such that the first and second platens are spaced apart from each other via an air gap.

Clause 3. The system of Clause 2, wherein the air gap ranges from about 1 millimeters (mm) to about 25 mm.

Clause 4. The system of Clause 2, wherein the second platen comprises a plurality of channels for circulating a cooling fluid therethrough during the cooling mode, wherein circulating the cooling fluid through the channels lowers a temperature of the second platen.

Clause 5. The system of any of the preceding Clauses, wherein the second platen comprises, at least, a first portion and a second portion, the second portion extending outside of the opposing press plates of the forming assembly, the second portion cooled independently of the first portion.

Clause 6. The system of Clause 5, wherein the second platen further comprises a thermal barrier between the first and second regions.

Clause 7. The system of any of the preceding Clauses, wherein the forming assembly further comprises a plurality of elastic deformable members connected between the first and second platens, each of the plurality of elastic deformable members being recessed within at least one of the first and second platens.

Clause 8. The system of any of the preceding Clauses, further comprises first and second caul plates, wherein the at least one platen assembly comprises a first platen assembly arranged above the first and second caul plates and a second platen assembly arranged below the first and second caul plates, the first and second platen assemblies each comprising the first and second platens.

Clause 9. The method of Clause 8, wherein the first and second caul plates are continuous belts that rotate through the heating and cooling assemblies.

Clause 10. The system of Clause 8, wherein the second platens comprise rounded edges.

Clause 11. The system of Clause 8, wherein the opposing press plates are integral with the first platens of the first and second platen assemblies.

Clause 12. The system of any of the preceding Clauses, further comprising one or more spacers for controlling a final thickness of the panel, the one or more spacers positioned within the forming assembly.

Clause 13. The system of any of the preceding Clauses, further comprising a spool, wherein, upon cooling, the panel is separated from the first and second caul plates and spooled onto the spool.

Clause 14. A method for manufacturing a panel, the method comprising:
providing at least one forming assembly having at least one platen assembly with first and second platens;
heating the first platen to a predetermined temperature range;
maintaining the first platen at the predetermined temperature range;
positioning one or more layers of material to be consolidated within the forming assembly;
applying pressure to the layers of material to be consolidated via the forming assembly; and,
varying a conduction rate between the first and second platens so as to provide heating and cooling to the one or more layers of material to be consolidated, thereby consolidating the panel.

Clause 15. The method of Clause 14, wherein varying the conduction rate between the first and second platens further comprises:
coupling the first and second platens together via a variable heat transfer mechanism; and,
during a heating mode of the forming assembly, adjusting the variable heat transfer mechanism to allow greater heat transfer from the first platen to the second platen so as to heat the one or more layers of material to be consolidated, thereby consolidating the panel.

Clause 16. The method of Clause 15, wherein, during a cooling mode of the forming assembly, further comprising:
adjusting the variable heat transfer mechanism to reduce the heat transfer from the first platen to the second platen; and
circulating a cooling fluid through one or more channels of the second platen to cool the second platen and the one or more layers of material.

Clause 17. The method of Clauses 14-16, further comprising arranging a plurality of forming assemblies together to form the panel, the plurality of forming assemblies being spaced apart by a length that is less than a length of one of the forming assemblies.

Clause 18. The method of Clause 16, wherein the variable heat transfer mechanism comprises at least one elastic deformable member.

Clause 19. The method of Clause 18, wherein adjusting the variable heat transfer mechanism to increase the heat transfer from the first platen to the second platen during the heating mode further comprises compressing the at least one elastic deformable member such that the first and second platens contact each other.

Clause 20. The method of Clause 18, wherein adjusting the variable heat transfer mechanism to reduce the heat transfer from the first platen to the second platen during the cooling mode further comprises relaxing the at least one elastic deformable member such that the first and second platens are spaced apart from each other via an air gap.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for manufacturing a panel, the system comprising:
    a forming assembly comprising opposing press plates and at least one platen assembly arranged between the opposing press plates, the at least one platen assembly comprising first and second platens connected together via at least one elastic deformable member, the forming assembly operable in a heating mode and a cooling mode, the first platen being maintained at a predetermined temperature range during each of the heating and cooling modes;
    wherein, during the heating mode, the at least one elastic deformable member is compressed such that the first and second platens contact each other, and wherein one or more layers of material to be consolidated is held by the forming assembly as the forming assembly applies heat and pressure to the one or more layers of material to be consolidated, thereby consolidating the panel;
    the opposing press plates having an entry end where the one or more layers of material enter between the opposing press plates and an exit end where the consolidated layers of material exit from between the opposing press plates in a direction of travel of the one or more layers of material through the forming assembly; and
    wherein the second platen comprises, at least, a first portion and a second portion, the second portion extending outside of the opposing press plates adjacent the exit end of the opposing press plates, the second portion cooled independently of the first portion.

2. The system of claim 1, wherein, during the cooling mode, the at least one elastic deformable member is relaxed such that the first and second platens are spaced apart from each other via an air gap.

3. The system of claim 2, wherein the air gap ranges from about 1 millimeters (mm) to about 25 mm.

4. The system of claim 2, wherein the second platen comprises a plurality of channels for circulating a cooling fluid therethrough during the cooling mode, wherein circulating the cooling fluid through the channels lowers a temperature of the second platen.

5. The system of claim 1, wherein the second platen further comprises a thermal barrier between the first and second regions.

6. The system of claim 1, wherein the forming assembly further comprises a plurality of elastic deformable members connected between the first and second platens, each of the plurality of elastic deformable members being recessed within at least one of the first and second platens.

7. The system of claim 1, further comprises first and second caul plates, wherein the at least one platen assembly comprises a first platen assembly arranged above the first and second caul plates and a second platen assembly arranged below the first and second caul plates, the first and second platen assemblies each comprising the first and second platens.

8. The system of claim 7, wherein the first and second caul plates are continuous belts that rotate through the heating and cooling assemblies.

9. The system of claim 7, wherein the second platens comprise rounded edges.

10. The system of claim 7, wherein the opposing press plates are integral with the first platens of the first and second platen assemblies.

11. The system of claim 1, further comprising one or more spacers for controlling a final thickness of the panel, the one or more spacers positioned within the forming assembly.

12. The system of claim 7, further comprising a spool, wherein, upon cooling, the panel is separated from the first and second caul plates and spooled onto the spool.

* * * * *